United States Patent
Boldi et al.

(10) Patent No.: US 8,270,987 B2
(45) Date of Patent: Sep. 18, 2012

(54) RADIO-ACCESS METHOD, RELATED RADIO BASE STATION, MOBILE-RADIO NETWORK AND COMPUTER-PROGRAM PRODUCT USING AN ASSIGNMENT SCHEME FOR ANTENNAS' SECTORS

(75) Inventors: Mauro Boldi, Turin (IT); Paolo Gianola, Turin (IT); Roberto Quasso, Turin (IT)

(73) Assignee: Telecom Italia S.p.A., Milan (IT)

( * ) Notice: Subject to any disclaimer, the term of this patent is extended or adjusted under 35 U.S.C. 154(b) by 1092 days.

(21) Appl. No.: 11/887,472

(22) PCT Filed: Mar. 31, 2005

(86) PCT No.: PCT/EP2005/003401
§ 371 (c)(1), (2), (4) Date: Sep. 28, 2007

(87) PCT Pub. No.: WO2006/102919
PCT Pub. Date: Oct. 5, 2006

(65) Prior Publication Data
US 2009/0238566 A1    Sep. 24, 2009

(51) Int. Cl.
*H04W 72/00* (2009.01)
*H04B 10/20* (2006.01)
(52) U.S. Cl. ....... 455/452.1; 455/63.4; 398/59; 398/115
(58) Field of Classification Search ................ 455/63.4, 455/452.1, 422, 562, 436, 450, 501, 561; 370/329, 345, 343, 352, 468, 315, 328, 474; 398/59
See application file for complete search history.

(56) References Cited

U.S. PATENT DOCUMENTS

| | | | |
|---|---|---|---|
| 5,265,263 | A | 11/1993 | Ramsdale et al. |
| 5,627,879 | A | 5/1997 | Russell et al. |
| 6,308,085 | B1 | 10/2001 | Shoki |
| 6,320,540 | B1 | 11/2001 | Meredith |
| 6,496,490 | B1 * | 12/2002 | Andrews et al. ............. 370/329 |
| 6,597,678 | B1 | 7/2003 | Kuwahara et al. |
| 6,621,469 | B2 | 9/2003 | Judd et al. |
| 7,738,789 | B2 * | 6/2010 | Sulzberger et al. ............. 398/59 |
| 2003/0032424 | A1 | 2/2003 | Judd et al. |
| 2004/0109434 | A1 * | 6/2004 | Hwang ......................... 370/345 |

(Continued)

FOREIGN PATENT DOCUMENTS
EP    0 391 597 A2    10/1990
(Continued)

OTHER PUBLICATIONS

Laiho et al.; "Radio Network Planning and Optimisation for UMTS"; Coverage and Capacity Enhancements Methods, John Wiley & Sons, Ltd., pp. 322-325, (2001).

(Continued)

*Primary Examiner* — Kiet Doan
(74) *Attorney, Agent, or Firm* — Finnegan, Henderson, Farabow, Garrett & Dunner, L.L.P.

(57) ABSTRACT

A radio base station for a mobile radio network, includes a set of remote units connected with the radio base station, preferably via a radio over fibre arrangement. Each remote unit provides radio cell coverage by means of a set of communication channels, and is equipped with a respective set of antenna elements. The communication channels are distributed over the antenna elements according to an assignment scheme that is dynamically variable.

24 Claims, 6 Drawing Sheets

U.S. PATENT DOCUMENTS

2004/0218563 A1* 11/2004 Porter et al. .................. 370/329
2004/0224637 A1* 11/2004 Silva et al. .................. 455/63.4

FOREIGN PATENT DOCUMENTS

WO    WO-2004/047472 A1    6/2004
WO    WO-2006/102918 A1    10/2006

OTHER PUBLICATIONS

Ojampers et al.; "Wideband CDMA for Third Generation Mobile Communications"; Artech House, pp. 252-253, (1998).

"Spreading and Modulation (FDD)"; Universal Mobile Telecommunications System (UMTS); (3GPP TS 25.213 Version 6.1.0. Releace 6); ETSI TS 125 213 V6.1.0, pp. 1-32, (Dec. 2004).

"RRC Protocol Specification"; $3^{rd}$ Generation Partnership Project (3GPP); Technical Specification Group (TSG) RAN; Working Group 2 (WG2), TS 25.331 V3.0.0, pp. 1,2,14,227-229, (Oct. 1999).

"Requirements for Supporting Radio Resource Management (FDD)"; $3^{rd}$ Generation Partnership Project (3GPP); Technical Specification Group (TSG) RAN; Working Group 4 (WG4); TS 25.133 v2.3.0, pp. 1-34, (Dec. 1999).

"Physical Layer Procedures (FDD)"; $3^{rd}$ Generation Partnership Project: Technical Specification Group Radio Access Network; (Release 1999), 3GTS 25.214 V3.2.0, pp. 1-41, (Mar. 2000).

"UE Procedures in Idle Mode and Procedures for Cell Reselection in Connection Mode"; $3^{rd}$ Generation Partnership Project; Technical Specification Group Radio Access Network; (3G TS 25.304 version 3.1.0), pp. 1-45, (Dec. 1999).

OBSAI (Open Base Station Architecture Initiative), "The Development and Benefits of an Open Base Station Architecture," White Paper MWG-040318-006-01, Issue 1-02, Mar. 13, 2003, pp. 1-16.

CPRI Specification V2.0, "Common Public Radio Interface (CPRI); Interface Specification," Oct. 1, 2004, pp. 1-75.

* cited by examiner

Fig_8

Fig_9

RADIO-ACCESS METHOD, RELATED RADIO BASE STATION, MOBILE-RADIO NETWORK AND COMPUTER-PROGRAM PRODUCT USING AN ASSIGNMENT SCHEME FOR ANTENNAS' SECTORS

CROSS REFERENCE TO RELATED APPLICATION

This application is a national phase application based on PCT/EP2005/003401, filed Mar. 31, 2005, the content of which is incorporated herein by reference.

FIELD OF THE INVENTION

The present invention relates to techniques for radio access in mobile-radio networks.

The invention has been developed with particular attention paid to its possible use in networks employing distributed radio base stations.

DESCRIPTION OF THE RELATED ART

Mobile-radio systems must guarantee a service of communication between a telecommunications network and mobile terminals (user terminals) randomly distributed over a certain service area. The radio coverage of this area is obtained by installing a plurality of radio base stations, each of which has the task of covering a certain portion of the area, referred to as a cell, from which there derives the name "cellular systems". The generic mobile terminal can communicate with the communications network through one of the radio base stations of the system, for example the one from which it receives the radio signal with best quality. The procedures through which the terminal, once it is turned on, chooses the radio base station from which to receive the system information are designated by the term "cell selection". Some systems (for example UMTS, Universal Mobile Telecommunications System) envisage the possibility that a user terminal will be served simultaneously by a plurality of radio base stations; this condition is designated by the term "macro-diversity". The characteristics of mobility of the users render necessary the presence of appropriate handover (or handoff) procedures designed to guarantee the continuity of the communication in the passage, between one cell and another. Each radio base station transmits on the downlink a plurality of communication channels, corresponding to different signalling or service specific data flows. The term "pilot channel" or "beacon channel" designates a particular communication channel corresponding to a known sequence of bits (the characteristics of which differ from system to system). The user terminal measures the radio quality of the beacon channels that it manages to receive and, on the basis of these measurements, selects the serving cell in the "cell selection" step or in the "handover" step.

The requirements in terms of capacity and coverage in densely urbanized areas lead in many cases to the need for providing cell networks with a high site density. In this context, the use of microcells affords significant advantages in terms of simplicity of acquisition of the sites, of increase in the capacity of the radio interface, and of greater efficiency in terms of indoor penetration as documented in J. Laiho et al. "Radio Network Planning and Optimisation for UMTS", Wiley, 2001.

As compared to conventional cells (frequently indicated as macrocells), the microcells have the following distinctive characteristics:

limited radius of cell (typically less than 400-500 m);
positioning of the radiating apparatus at a height lower than the average height of the surrounding buildings; and
limited transmitted power (typically less than 5 W).

A technical problem associated to the widespread use of microcells is linked to the service provided to high-mobility users. A user who is moving at a high speed in a microcell context, in fact, carries out a very large number of handover procedures between the cells, which cause a signalling overload both on the uplink and on the downlink. In addition to the signalling overload it should be recalled that associated to the operations of measurement and to the consequent operations for support of the mobility are processing delays, which, in the case of small cell dimensions, may prove critical for execution of the handoff procedures, with consequent possible drop of the call.

A possible solution to this problem is the contextual use of microcells and macrocells. Macrocells are used to guarantee a service for high-mobility users, whilst microcells are used for offering a high-capacity service to low-mobility users (for example, to provide high-bitrate packet services).

For the purpose of optimizing (also at the level of network planning) the radio coverage between the macrocell and microcell layers it is advantageous to use, in particular in macrosites, reconfigurable antennas. These antennas (oftentimes referred to as "smart" antennas) are able to modify the radiation diagram so as to optimize the radio coverage, minimizing interference on the adjacent cells.

In the case of UMTS, with particular reference to the FDD (Frequency Division Duplex) component, the level of macrocell coverage and the level of microcell coverage can use the same W-CDMA (Wideband Code Division Multiple Access) radio carrier or else distinct carriers.

As highlighted in T. Ojampera, R. Prasad, "Wideband CDMA for Third Generation Mobile Communications", Artech House, 1998, the use of a system with macrocells and microcells on the same W-CDMA carrier presents numerous problems of design and operation. One of the most important problems, referred to by the term "near-far", is represented by the following condition: a mobile terminal, albeit located in the proximity of a microcell, is served by a macrocell. This condition can be caused, for example, by a delay in the handover procedures, as referred to previously, and brings about an increase in the interference suffered by the microcell and, consequently, a deterioration in the performance for all the users served by the microcell itself.

Typically, hence, different W-CDMA carriers are used for the microcell level and for the macrocell level. Frequently, however, UMTS operators have a very limited number of carriers available. The need of using different carriers for the two layers constitutes a major constraint in the setting-up of UMTS networks. In the case where the operator has only two carriers available for example, this constraint results in an obligate choice, and prevents alternative solutions such as, in particular, the use of both of the carriers at the microcell level, which maximizes the overall capacity of the W-CDMA radio access.

A solution known in the art provides for associating with single radio base station a plurality of antenna points/elements, e.g. via a Radio Over Fiber (ROF) communication system. A number of documents address the problem of flexibility and reconfigurability of the radio base stations. For instance, WO-A-2004/047472 describes a main-remote radio base station system including plural remote radio units (RRUs). Fiber costs are significantly reduced using a single optical fiber that communicates information between the main unit and the remote units connected in a series configuration. Information from the main unit is sent over a first fiber path to the remote units so that the same information is transmitted over the radio interface by the remote units as at substantially the same time. The main unit receives the same information from each of the remote units over a second fiber path at substantially the same time. Delay associated with each remote unit is compensated for by advancing the time when information is sent to each remote unit. A data distribution approach over a single fiber avoids the expense of separate fiber couplings between the main unit and each remote radio unit or RRU. That approach also avoids the expense of WDM technology including lasers, filters, an OADMs as well as the logistical overhead needed to keep track of different wavelength dependent devices.

Also those arrangements that aim only at reconfigurability of the antenna may play a role in this context. For instance, U.S. Pat. No. 6,621,469 discloses a distributed antenna device including a plurality of transmit antenna elements, a plurality of receive antenna elements and a plurality of amplifiers. One of the amplifiers is a power amplifier operatively coupled with each of the transmit antenna elements and mounted closely adjacent to the associated transmit antenna element, such that no appreciable power loss occurs between the power amplifier and the associated antenna element. At least one of the amplifiers is a low noise amplifier and is built into the distributed antenna device for receiving and amplifying signals from at least one of the receive antenna elements. Each power amplifier is a relatively low power, relatively low cost per watt linear amplifier chip.

Solutions like the one described in U.S. Pat. No. 6,621,469 present the limit of proposing reconfiguration of the radiating element only, and not of any function of the remote unit.

OBJECT AND SUMMARY OF THE INVENTION

The applicant has identified a need for defining arrangements wherein dynamic management of the radio resources may be dealt with in a more satisfactory way than in the prior art considered in the foregoing.

More specifically, the need is felt for improved arrangements wherein:
  certain basic limitations as regards flexibility in the remote stations (e.g. enabling time alignment of the frames only as an advanced processing option) are dispensed with, thus improving the degree of reconfigurability of the network, including antenna reconfigurability,
  the overall degree of flexibility of the system is increased, without being restricted only to employing a greater or smaller number of radio resources on the optical network, and may also be extended to the remote stations,
  improved flexibility is achieved in terms of use and of number of beacon channels that can be handled (as a whole, in terms of signal processing) as compared to conventional arrangements.

The object of the present invention is to satisfactorily meet the needs outlined in the foregoing.

In accordance with the present invention, the above object is achieved by a method having the characteristics recited in the claims that follow.

The present invention relates also to a corresponding radio base station, a corresponding network as well as a computer program product, loadable into the memory of at least one computer and comprises portions of software code for implementing the method of the invention. As used herein, reference to such a "computer-program product" is understood as being equivalent to the reference to a means that can be read by a computer and contains instructions for controlling a computer system for the purpose of coordinating the performance of the process according to the invention. Reference to "at least one computer" is aimed at highlighting the possibility that the present invention may be implemented in a distributed way and/or a modular way.

The claims form an integral part of the disclosure of the invention provided herein.

A preferred embodiment of the invention provides for controlling operation of at least one radio base station in a mobile radio network by:
  connecting with the radio base station a set of remote units, each remote unit adapted to provide radio cell coverage by means of a set of communication channels, and being equipped with a respective set of antenna elements whereby the communication channels are distributed over the antenna elements according to an assignment scheme, and
  dynamically varying the assignment scheme.

A preferred embodiment of the arrangement described herein comprises an architecture based upon a system of distributed antennas connected via a digital connection to one or more radio base stations and which enables a dynamic management of the radio resources. In a preferred configuration each antenna (or remote unit) can be reconfigured in terms of radio resources (type and number of cells assigned) and of antenna diagram.

The main advantages of the arrangement described herein in direct comparison to conventional prior art arrangements are:
  a) the possibility of—dynamicaily—handling and controlling i.a.:
    the radio resources assigned to each remote unit;
    the radiation diagram of each antenna; and
    the architecture of the hierarchical levels between macrocell sites and microcell sites;
  b) all the operations of management and control performed on the antennas are carried out through normal O&M (Operation and Maintenance) functions without interacting directly with hardware or software reconfigurations on the radio base station.

In such a preferred arrangement, the assignment criteria, or more in general the assignment methods, normally depend upon:
  the coverage data obtained in the planning procedure;
  data of voice traffic and data traffic measured by the network;
  data of traffic localization obtained by applying dedicated algorithms; and
  data of point measurements of coverage and interference.

A preferred implementation of the architecture described herein uses ROF digital technology in ring configuration, and the related diagrams refer specifically to distributed antennas connected to one or more radio base stations by means of optical rings.

A particularly preferred embodiment of the arrangement described herein involves the availability of radio base stations with digital interface.

The exemplary arrangement described herein is thus an architecture including completely reconfigurable remotized stations, enabling a complete functionality of processing of the signal received and transmitted (in the two links of reception and transmission of the radio signal).

BRIEF DESCRIPTION OF THE DRAWINGS

The invention will now be described, by way of non-limiting example, with reference to the figures of the annexed plate of drawings, wherein.

DETAILED DESCRIPTION OF EXEMPLARY EMBODIMENTS OF THE INVENTION

Figure 1:
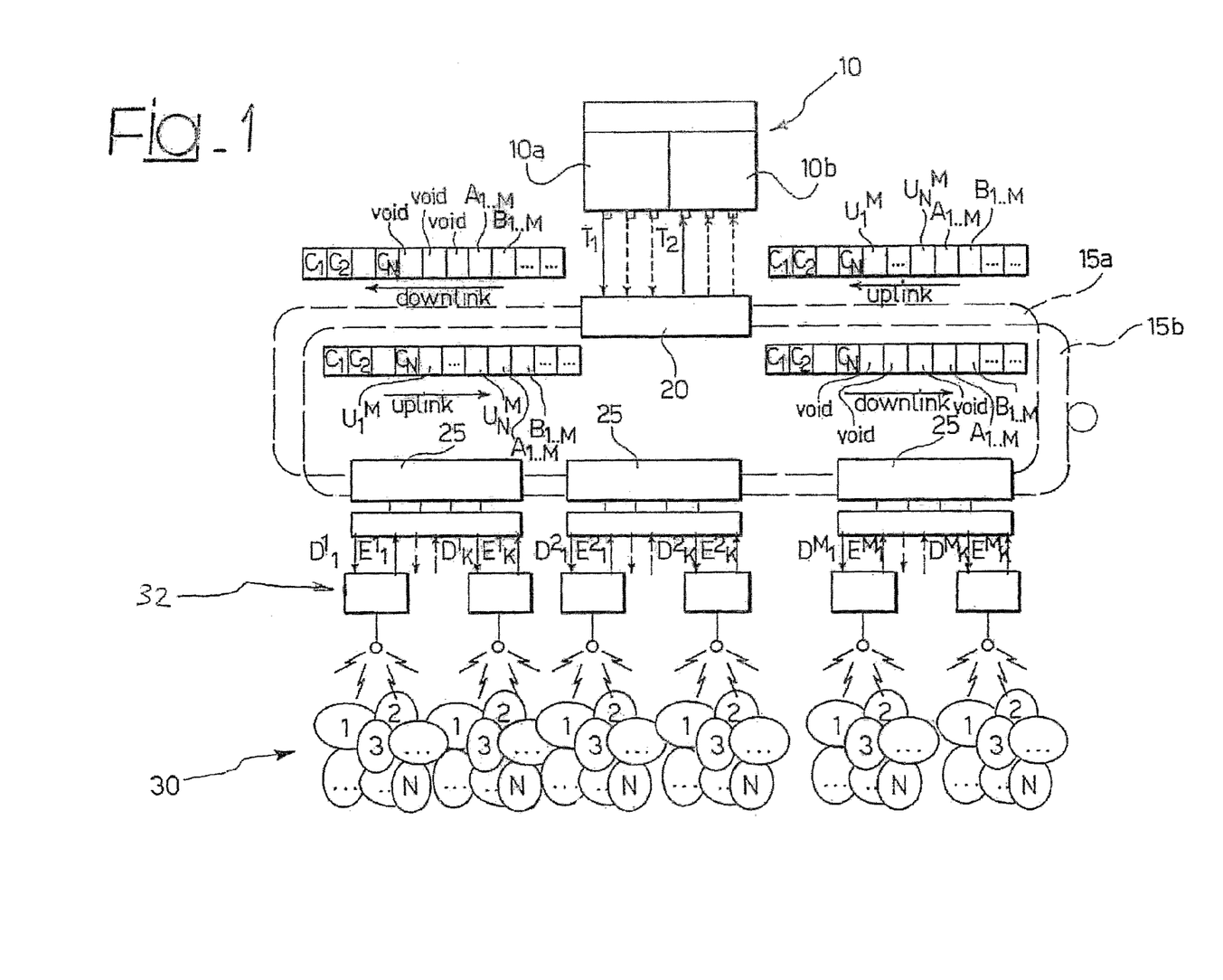
FIGS. 1 and 2 show examples of network architectures as described herein.

FIG. 1 provides an exemplary schematic representation of the architecture of a radio base station (BTS or Node B) in a mobile-radio network (not shown as whole). Specifically, a radio base station 10 is considered, which has an optical-to-digital interface with three data flows in the downlink and, accordingly, three data flows in the uplink.

The radio base station 10 (which may be in the form of a conventional BTS) comprises a subsystem 10a that handles transmission of the signals in the downlink for the three data flows, and a subsystem 10b, which comprises the apparatuses dedicated to reception of the signals in the uplink.

$T_1$ represents the first of the three flows in the downlink and $T_2$ the first of the three flows in the uplink. In the example considered, each flow is routed onto an optical-fibre ring 15a and 15b by means of an optical transmitter, in the downlink case, or optical receiver, in the uplink case. The flows can be routed on the same optical fibre 15a or 15b by means of an optical multiplexer/demultiplexer 20 exploiting different wavelengths in a typical Wavelength Division Multiplex (WDM) arrangement.

The exemplary solution shown in FIG. 1 meets the need of having symmetry of delays between the transmission link from the radio base station 10 (Node B) to a reconfigurable remote radio unit 25 and vice versa (downlink and uplink paths with comparable delays and lengths).

Figure 2:
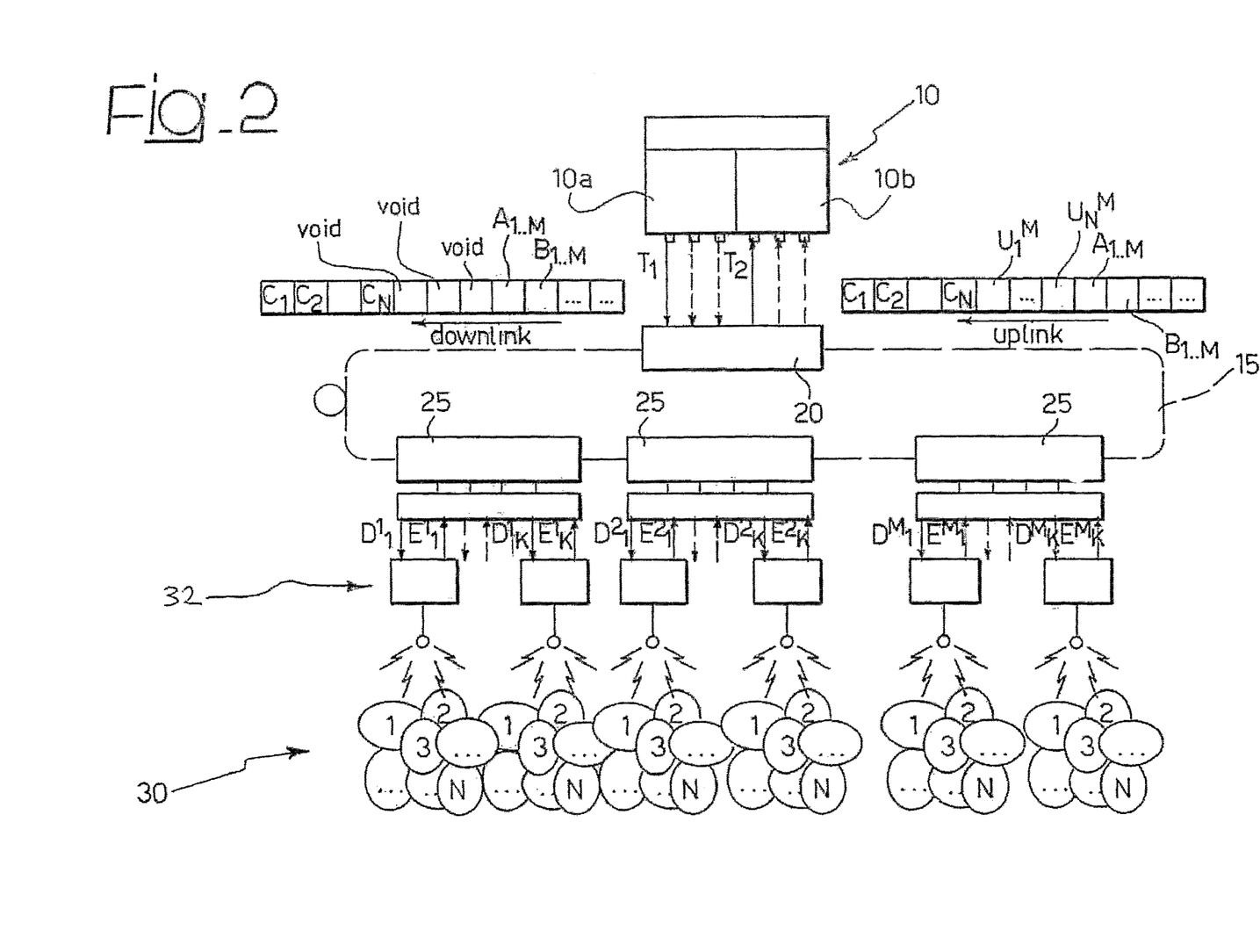

This cannot be obtained using architectures with just one optical fibre 15 per flow $T_i$, such as the one appearing in FIG. 2. In this case, in fact, the path would be symmetrical only for an individual remote unit set exactly half way along the ring.

Instead, in the architecture shown in FIG. 1, the two transmission paths in opposite directions over the two fibres 15a and 15b always present the same propagation delay. In fact, for each remote unit 25 the downlink flow travels on a first optical fibre (15a or, respectively, 15b) in a first direction, and the uplink flow travels on a second optical fibre (15b or, respectively, 15a), proceeding along the same path as the first, but in the opposite direction.

In FIGS. 1 and 2, the remote units 25 are shown coupled with respective sets of antenna elements 32. As better detailed in the following, these antenna elements are adapted to serve (i.e. provide radio coverage for) a set of cells 30, generally including N cells, namely cell1, cell2, . . . , cellN.

From the technological standpoint and the standpoint of practical implementation, the architecture illustrated in FIG. 2 may not be compatible with certain types of Node-B releases commercially available today. However, whenever adapted to be integrated with the configuration of a radio base stations, the embodiment of FIG. 2 may be advantageous in terms of saving of optical fibre as compared to the case of FIG. 1. Additionally, the architecture of FIG. 2 limits the recourse to redundancy schemes and is hence riskier in the case of failures in a point of the optical ring 15.

Apart from these differences, the two architectures shown in FIGS. 1 and 2 functionally coincide. Additionally, those of skill in the art will promptly appreciate that, by resorting to a WDM (Wavelength Division Multiplexing) arrangement, the two optical fibre channels here exemplified in the form of two distinct optical fibres 15a and 15b can in fact be carried over a single optical fiber.

Figure 3:
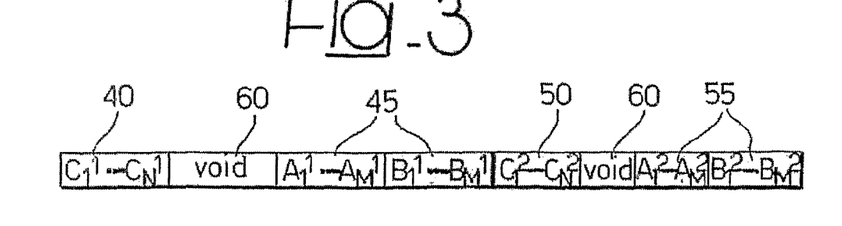
FIG. 3 shows an example of a digital frame adapted to be used in the downlink path of the architecture of FIG. 1.

FIG. 3 is a schematic illustration of an exemplary frame structure corresponding to the downlink data flow $T_1$. In the scheme of FIG. 3 it is assumed that in the flow $T_1$ the user data and control signals corresponding to two radio carriers, for example W-CDMA ones, will be present.

The reference number 40 of FIG. 3 designates the user data signals assigned to the carrier 1, whilst the reference number 45 designates as a whole the control signals corresponding to the carrier 1. Likewise, the reference number 50 designates the useful signals assigned to the carrier 2, whilst the reference number 55 designates as a whole the control signals corresponding to the carrier 2.

Reference to two carriers is of course of exemplary nature only.

Some spaces 60 are intentionally left free. These spaces are intended to host the uplink useful data that are loaded in the frame as this reaches the M remote stations present on the ring.

The following quantities are defined:

N=number of cells belonging to one and the same carrier and one and the same digital frame;

M=number of remote units;

K=maximum number of radiating elements per remote unit;

$C_i^y$=data signal of the cell i corresponding to the carrier y; i is comprised between 1 and N, and y is comprised between 1 and the number of physical carriers (here, for example, equal to two);

$A_j^y$ represent a control signal (expressed in the form of a matrix) of the remote unit j corresponding to the carrier y for handling the downlink flow; j is comprised between 1 and M; y is comprised between 1 and the number of physical carriers (here, for example, equal to two); specifically, $A_{li}^j$ represents the l-th row and i-th column value of the matrix $A_j^y$ in the form of a coefficient (in general a complex number) for the element l of the remote unit j corresponding to the cell i for handling the downlink flow.

In the arrangement described herein, the generic remote radio unit j will carry out, for each radio carrier up to the maximum number of carriers for which it has been sized, a numeric processing of the data flow, identified by the frame illustrated schematically in FIG. 3, of the type:

$$\begin{bmatrix} D_1^j \\ D_2^j \\ \vdots \\ \vdots \\ D_K^j \end{bmatrix} = \begin{bmatrix} A_{11}^j & A_{12}^j & \Lambda & \Lambda & A_{1N}^j \\ A_{21}^j & O & & & \\ M & & A_{1i}^j & & \\ M & & & O & \\ A_{K1}^j & & & & A_{KN}^j \end{bmatrix} \cdot \begin{bmatrix} C_1^j \\ C_2^j \\ \vdots \\ \\ C_N^j \end{bmatrix} \quad (1)$$

where $D_l^j$ represents the resulting signal that supplies the radio-chain corresponding to the element l of the remote unit j as highlighted in FIGS. 1 and 2. It is to be noted that the coefficients $C_i^j$ here have a superscript j to indicate that they refer to the remote unit j, even though this coefficients, in this case of downlink transmission, do not change from station to station. It may also be noted that Equation (1) still holds in the multicarrier case.

In this case, the solution described herein envisages the possibility of carrying out separately both the matrix product, carrier by carrier, and the product of all the carriers with just one matrix in which all the parameters are englobed (it is sufficient to include the coefficients A and C for the carrier 2 queued to those of the carrier 1, and so forth for any other possible carriers).

Figure 4:
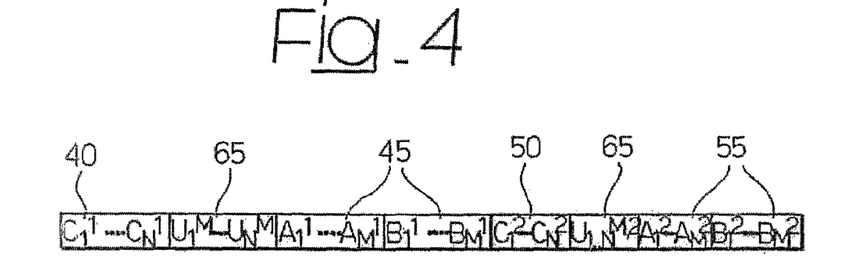
FIG. 4 shows an example of a digital frame adapted to be used in the uplink path of the architecture of FIG. 1.

Likewise, FIG. 4 is a schematic illustration of an example of structure of the frame corresponding to the uplink data flow of $T_2$ for two carriers, for example W-CDMA ones.

In FIG. 4, the reference number 40 designates the useful signals assigned to the carrier 1, whilst the reference number 45 designates as a whole the control signals corresponding to the carrier 1. Likewise, the reference number 50 designates the useful signals assigned to the carrier 2, whilst the reference number 55 designates as a whole the control signals corresponding to the carrier 2. In this case, the reference number 65 designates the useful uplink signal.

The parameters N, M and K assume the same meanings as for the downlink scheme, whilst the following quantities are moreover defined:

$U_i^{j,y}$=useful signal assigned to the cell i corresponding to the remote unit j and to the carrier y;

$E_l^j$=signal received at the element l of the remote unit j (not travelling on the ring);

$B_j^y$ represents a control signal (expressed in the form of a matrix) of the remote unit j corresponding to the carrier y for handling the uplink flow; j is comprised between 1 and M; y is, comprised between 1 and the number of physical carriers (here, for example, equal to two); specifically $B_{il}^j$ represents the i-th row and l-th column value of the matrix $B_j^y$ in the form of a coefficient (in general a complex number) of the element l of the remote unit j corresponding to the cell i for handling the uplink data flow.

According to the scheme described herein, the generic remote radio unit j will execute a numeric processing of the data flow, identified by the frame represented schematically in FIG. 4, of the type:

$$\begin{bmatrix} U_1^j \\ U_2^j \\ \vdots \\ U_N^j \end{bmatrix} = \begin{bmatrix} U_1^{j-1} \\ U_2^{j-1} \\ \vdots \\ U_N^{j-1} \end{bmatrix} + \begin{bmatrix} B_{11}^j & B_{12}^j & \Lambda & \Lambda & B_{1K}^j \\ B_{21}^j & O & & & \\ M & & B_{il}^j & & \\ M & & & O & \\ B_{N1}^j & & & & B_{KN}^j \end{bmatrix} \cdot \begin{bmatrix} E_1^j \\ E_2^j \\ \vdots \\ E_K^j \end{bmatrix} \quad (2)$$

It will be appreciated that the information related to the matrix B is transmitted (see e.g. the frame arrangements shown in FIGS. 3 and 4, and specifically the spaces 60 left void in the frame arrangement of FIG. 3 and subsequently loaded with the useful uplink data signal shown at 65 in FIG. 4) to the user terminals for use in uplink processing (i.e. uplink transmission).

The case described by Equation (2) differs substantially from Equation (1) in that in the uplink data flow a sum is performed of the contribution that flows into the remote radio station j from the remote radio station j−1 and the contribution of the remote radio station j itself, for each of the N possible cells considered.

In the operations envisaged for the downlink and described by Equation (1), this sum is not envisaged. In order to understand this difference, it must be taken into account that the numeric flows corresponding to the N cells ($C_i$ and $U_i$) are distributed in the numeric frame travelling on the optical ring according to methodologies of the TDM (Time Division Multiplexing) type.

The central Node B must transmit the flows $C_i$ separately and, at the same time, must receive the flows $U_i$ associating each of them to the corresponding cell handled by it. Consequently, in the case of the uplink flows, the flows $U_i$ must be summed together since they are interpreted by Node B as flows of one and the same cell, which in the architecture described is distributed in remote units possibly distinct and separate from one another.

In other words, the operation of addition present in Equation (2) describes the possibility that the remote stations will be able to function as cell repeaters (if the ingoing signal $U_i^{j-1}$ is zero, the remote radio station j adds thereto its own contribution; if the $U_i^{j-1}$ is not zero, the remote radio station j re-uses the same cell and adds its own contributions on the same $U_i^{j-1}$ generating $U_i^j$).

The Node B, in the architecture described herein, makes available to the system its transceiver resources, but otherwise presents in an altogether transparent way when the new functions described are introduced (possible architecture of the Node B already pre-arranged for ROF in a preferential set up).

Figure 5:
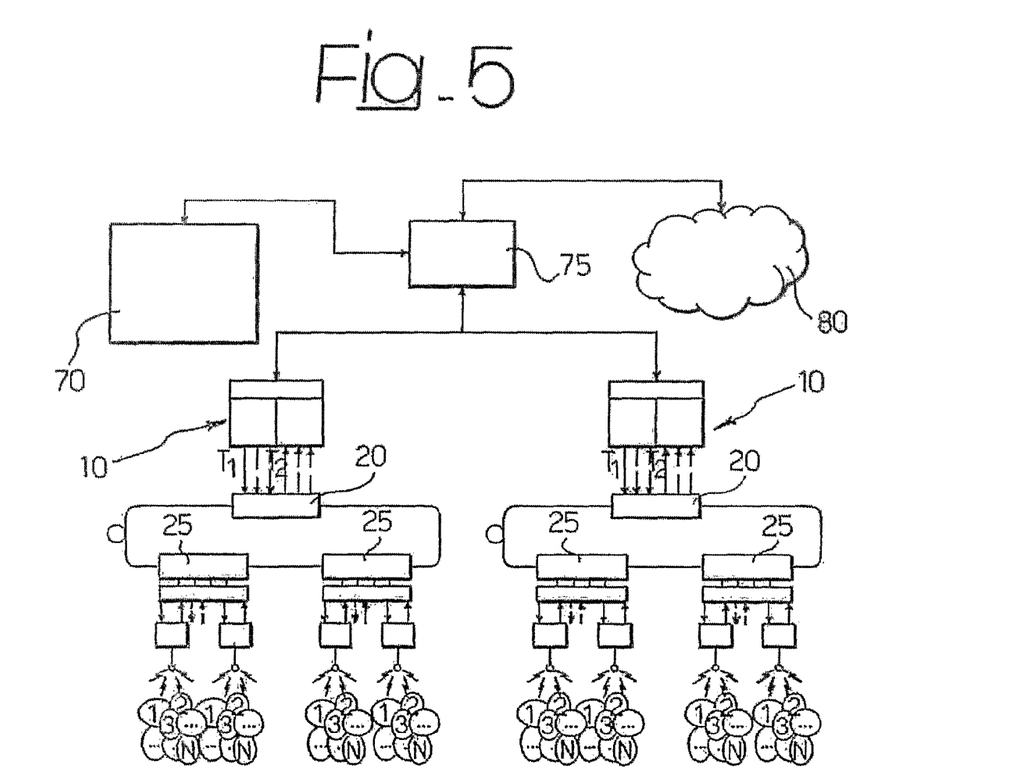
FIG. 5 shows an example of management of the reconfiguration of the remote stations in the architecture of FIG. 1.

The downlink control signals $A_i$ and uplink control signals $B_i$ are set at a top hierarchical level of the mobile network and travel through the Node B in a transparent way, terminating in the numeric flow that branches off therefrom towards the various remote stations. In detail, the architecture envisaged for management of the reconfiguration of the remote stations is represented in FIG. 5. In a block 70, the configuration matrix of the remotized stations is prepared, and the corresponding data flow travels in a transparent way through a radio network controller 75 to the various radio base stations 10 that come under it and are controlled thereby. In turn, the network controller 75 is connected in a traditional way to the core network 80 (in this exemplary case, it is the UMTS Core Network, but extension to other radio systems is direct and included in the scope of the invention).

In the following, a situation will be hypothesized (in a non-limiting manner) where the numeric flow is carried by the optical fibre in a ring configuration organized according to the specifications provided by international bodies such as CPRI (Common Public Radio Interface) or OBSAI (Open Base Station Architecture Initiative). Information about these specifications can be found at the web sites http://www.cpri.info/ and http://www.obsai.org/.

These specifications envisage, in the transport digital frame of the physical level, space for information of management and control, which differs from vendor to vendor. These reserved bytes could advantageously be used for the transit of information of reconfiguration and remote signal processing, such as the parameters $A_i$ and $B_i$ described previously. This is a low-bitrate data flow both on account of the meagreness of the information transmitted (many of the matrices described by Equations (1) and (2) are sparse) and because this information is likely to be transmitted with a somewhat long periodicity.

Remote signal processing, according to the present invention, allows to dynamically varying the assignment scheme of the distribution of communication channels over the antenna elements 32, thus varying capacity or coverage in the area served by the individual remote radio station. These planning variations respond in turn to criteria of variation of the traffic or the like, which are reasonably not affected by fast variations.

In the following an exemplary hardware description of the generic remote radio station will be provided.

Figure 6:
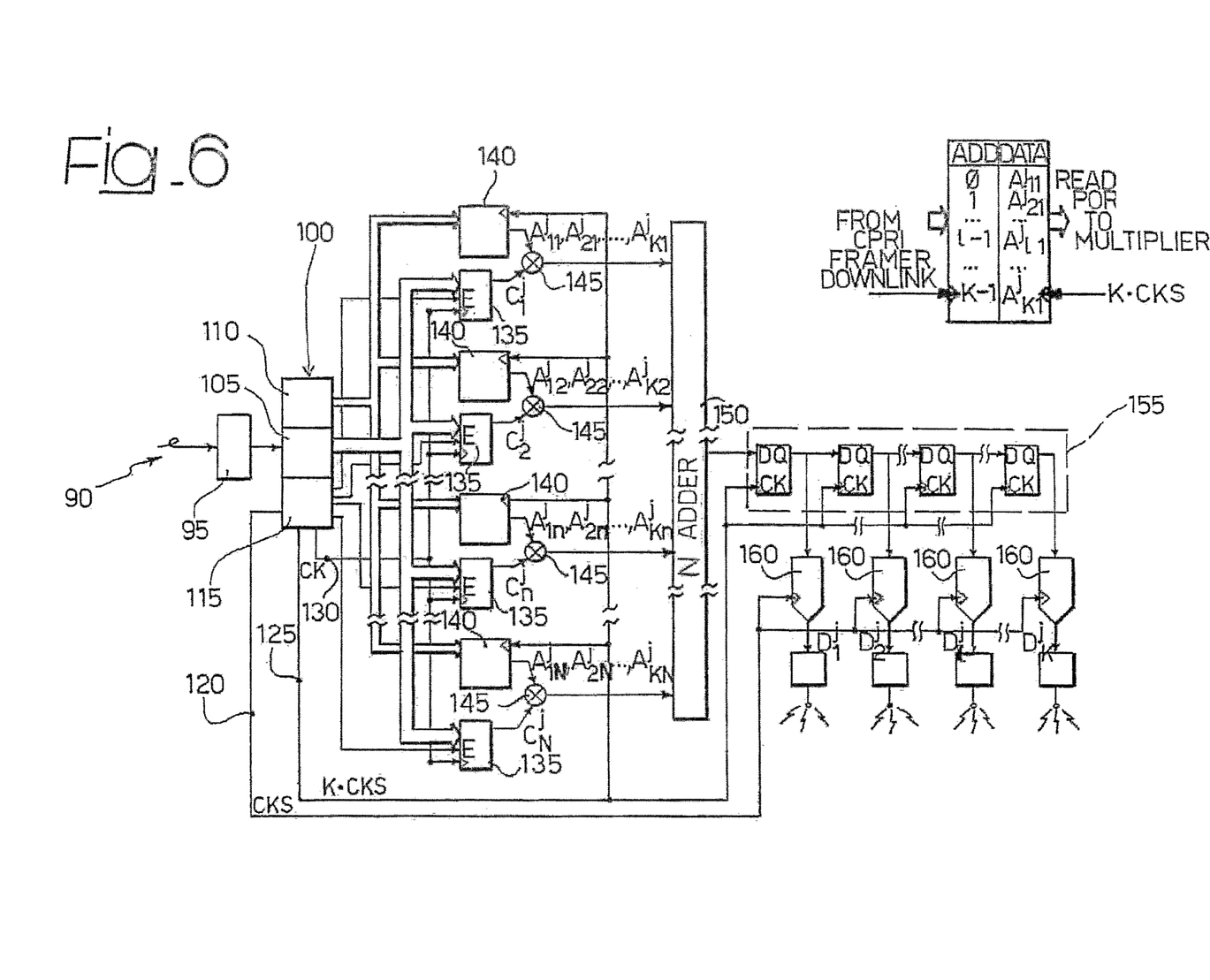
FIGS. 6 and 7 are block diagrams of exemplary embodiments of the downstream and the upstream sections of the arrangement described herein.

In particular, a first description of the downstream scheme is provided with reference to FIG. 6.

An optical signal 90 received by the Node B is assigned to an optical-to-electrical conversion stage 95, which converts it into a serial electrical signal, which goes at input to a logic block 100 dedicated to the frame functions according to the CPRI standard.

The block 100 is capable of identifying and separating the different information flows carried in the CPRI frames, in particular function 105 extracts a numeric flow that represents the useful signal of the various cells in complex numeric format, and function 110 extracts a numeric flow referred to as "vendor-specific" the contents of which are left to the discretion of the various implementations (and which in the case described carries the downstream complex coefficients).

Moreover highlighted are the timing functions 115 that lock the frequency of a local oscillator, which can be adjusted to the frequency of the bits 90 coming from the optical fibre. Given that the complex numeric samples $C_i$ have been generated and introduced into the CPRI frames in a synchronous way (in other words, the clock of the values $C_i$ and the clock of the bits 90 on the optical fibre are synthesised via multiplication and division of frequencies by integers starting from a single basis clock) it is possible, by means of appropriate division chains (not shown in FIG. 6) to reconstruct their clock signal (CKS) 120 at the antenna, and a multiple 125 thereof obtained by multiplication by an integer factor K (equal to the number of rows of the matrix).

A clock 130, accompanied by appropriate enable signals, is used for storing the complex values $C_i$ in registers 135 as they appear in the CPRI frames. The frequency of the clock 130 is greater than that of the clock signal 120, but the enable signals, directed to the inputs E of the various registers, cause the mean effective frequency of the writing operations to be the same as that of the clock signal 120.

The rest of the diagram of FIG. 6 represents a possible embodiment, which takes into account the possible effective values of the clock signal 120 (in the UMTS, 3.84 MHz or else integer multiples thereof) and hence the possibility of using in an efficient way the multiplier circuits 145, which are able to multiply two complex numbers at considerably higher frequencies (hundreds of MHz).

All the memories of a dual-port type 140 are pre-loaded with the values of the complex coefficients, according to the example indicated in the table on the top right in FIG. 6. Specifically, the exemplary table shown relates to the contents of the memory associated with $C_1^j$.

In other words, the i-th memory contains the values of the coefficients of a column of the matrix and is dedicated, with a register 135 and a multiplier 145 associated thereto, to processing of the useful signal of i-th cell $C_i$.

In fact, the registers 135 are shift registers having a depth equal to two. The full set of registers 135 can be seen as a two-stage register column. The first stage stores the samples as they appear sequentially in the current CPRI frame. When the first stage contains a complete and stable array of samples, a unique synchronization pulse (not shown in FIG. 6 for sake of simplicity) from the timing functions 115 shifts simultaneously all the samples to the second stage, whose outputs are connected to the multipliers 145.

The clock signal 125 is by construction K times faster and is used for addressing the dual-port memories 140 in such a way that, in the time interval during which the values $C_i$ stored in the second stage of the column of registers 135 do not change, the coefficients of the K rows of the matrix will appear sequentially at the inputs of the multipliers 145, will be multiplied with the various $C_i$, and all the products obtained will be summed by block 150.

This process sequentially generates K complex values $D_1$, $D_2$, ... $D_K$ which are stored in a right-shift register 155 connected to the outputs of block 150 and then presented at the inputs of conversion blocks 160. These blocks acquire them always using the clock signal 120 and regenerate the signals in an analogical format using a conventional conversion scheme.

The upstream scheme is instead described with reference to FIG. 7.

Figure 7:
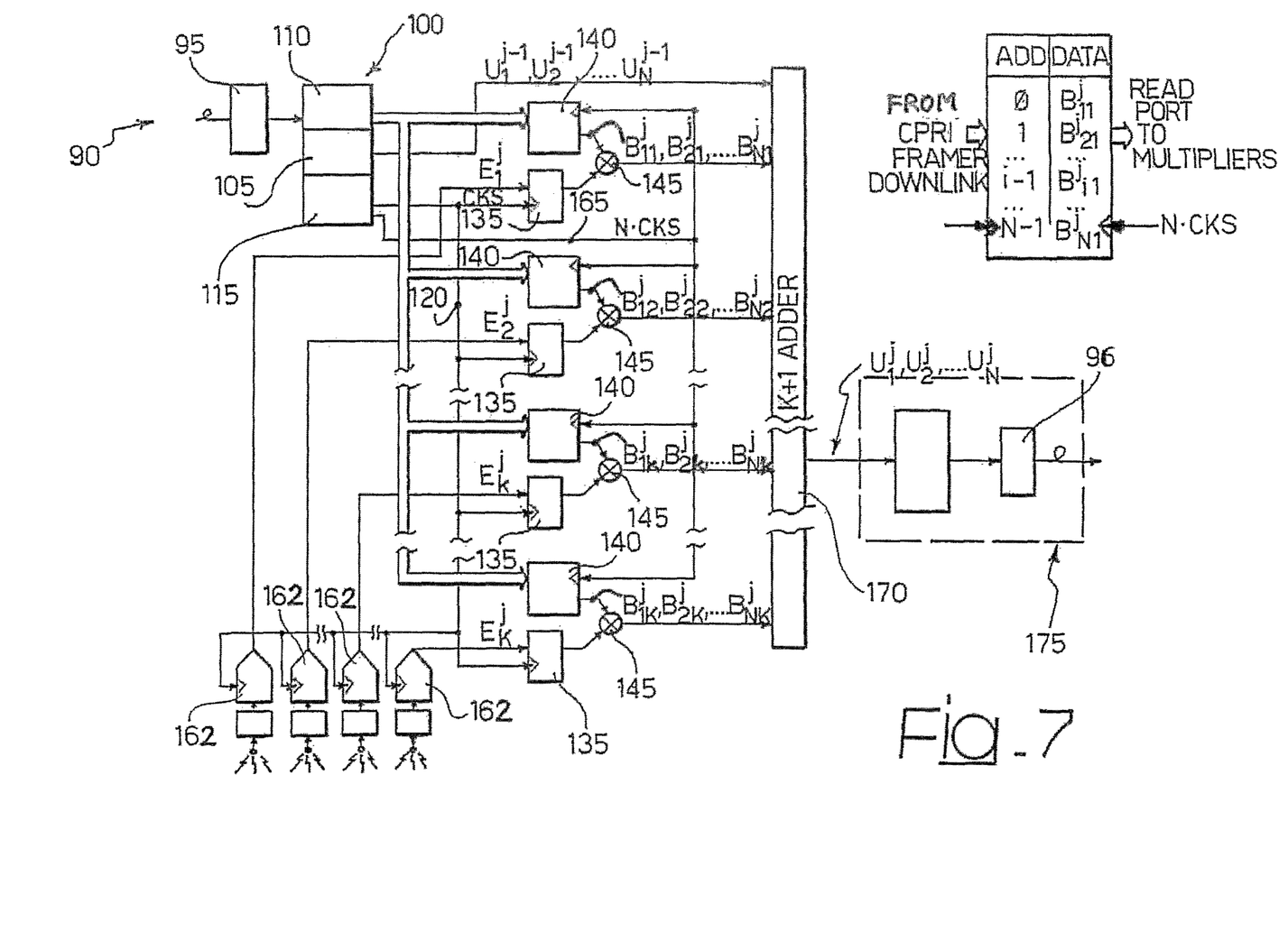

On the top left in FIG. 7 there are some of the blocks involved in the downstream case, where blocks identical or corresponding to those already introduced in FIG. 6 are designated by the same reference numbers. Specifically, while block 95 and part of block 115 are common to the circuits of both FIGS. 6 and 7, the registers 135, multipliers 145 and the dual port memories 140 have in fact the same characteristics but are provided distinctly for the circuit of FIG. 6—to implement the formula (1)—and for the circuit of FIG. 7—to implement the formula (2). The block designated 110 extracts information fields that are analogous but in fact different (namely the "B" coefficients in the place of the "A" coefficients). Since the samples are generated simultaneously, in the case of uplink circuitry the registers 135 may be in the form of single registers.

In the case of the circuit of FIG. 7, the block 105 provides the useful signals $U_1^{j-1}, \ldots, U_N^{j-1}$ from the (j−1)th station by ensuring that these signals are fed to an adder block 170 in the right order and synchronously with the signal 165 considered in the following.

In that respect it will be appreciated that the downlink circuitry also supports uplink operation in that the downlink circuitry provides the clock signals and the "B" coefficients from the downlink frame.

The optical signal 90 received by the Node B is assigned to an optical-to-electrical conversion stage 95, which converts it into a serial electrical signal, which goes at input to a logic block 100 dedicated to the frame functions according to the CPRI standard.

The block 100 is capable of identifying and separating the various information flows carried in the CPRI frames, in particular function 110 extracts a numeric flow referred to as "vendor-specific" the contents of which are left to the discretion of the various implementations (and which in the case considered carry the upstream coefficients). There are moreover highlighted the timing functions 115 that lock the frequency of a local oscillator that can be adjusted to the frequency of the bits 90 coming from the optical fibre. Given that the numeric samples $E_i$ must be generated synchronously, it is possible, by means of appropriate division chains (not shown in the figure), to synthesize at the antenna a clock signal 120 and a multiple 165 thereof obtained by multiplication by an integer factor N (equal to the number of rows of the matrix). The clock signal 120 drives the blocks 162, which generate the samples $E_i$ in the form of complex numbers using a conventional conversion scheme.

The rest of the diagram represents a possible embodiment, which takes into account the possible effective values of the clock signal 120 (in the UMTS, 3.84 MHz or else integer multiples thereof) and hence the possibility of using efficiently the multiplier circuits 145, which are able to operate at considerably higher frequencies (hundreds of MHz).

All the memories of the dual-port type 140 are pre-loaded with the values of the coefficients, according to the example indicated in the table on the top right. Specifically, the exemplary table shown relates to the contents of the uppermost memory, namely the one for $E_1^j$.

Stated otherwise, the i-th memory 140 contains the values of the coefficients of a column of the matrix and is dedicated, with the register 135 and the multiplier 145 associated thereto, to processing of the signal $E_i$ coming from the i-th antenna element 32.

The clock 165 is by construction N times faster and is used for addressing the dual-port memories 140 in such a way that, in the time interval during which the values $E_i$ stored on the registers do not change, the coefficients of the N rows of the matrix will appear sequentially at the inputs of the multipliers 145, will be multiplied by the various $E_i$, and all the products obtained will be summed up by the block 170.

The N values $U_1, U_2, \ldots, U_N$ generated sequentially are presented to the input of a block 175, which introduces them into CPRI frames, which are then sent into the optical fibre by means of an electrical-to-optical conversion stage 96.

A number of possible configurations of the architecture proposed herein will now be described.

The advantage of the solution described herein consists in providing the maximum flexibility in the configuration of a remotized radio station. Specifically, analysed herein are some possible configurations according to the complexity of processing requested in remote (from very sparse matrices to increasingly more complete matrices). In what follows, reference will be made to an individual optical-fibre ring, but the considerations already expressed as regards the differences between the schemes FIG. 1 and FIG. 2, and the corresponding architectures, apply.

The first possible configuration consists in a mere cell repeater with just one radiating element, in which case the matrices of Equations (1) and (2) will have just one coefficient other than zero, and $C_i$ and $U_i$ will be shared with other remote radio stations.

Figure 8:
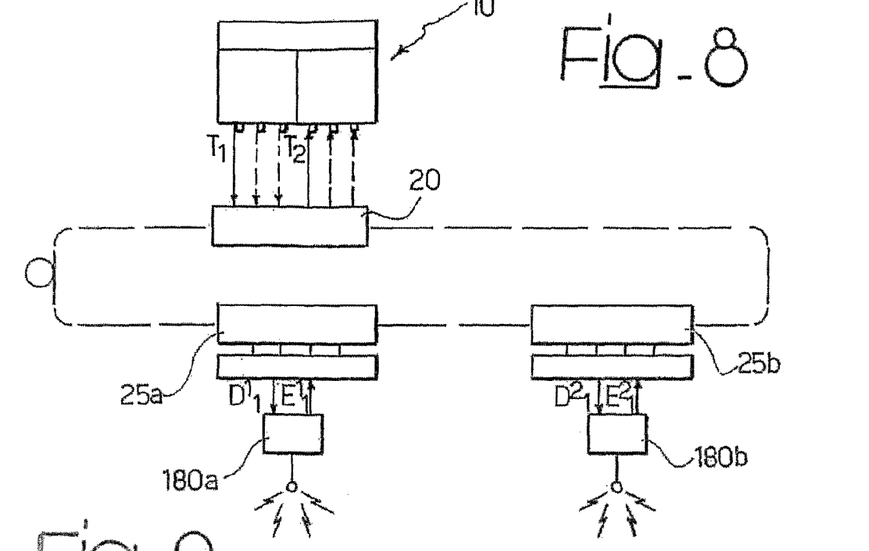
FIG. 8 shows an exemplary cell repeater configuration with just one radiating element.

FIG. 8 represents a schematic diagram of this solution in the case of two remote units 25a and 25b (M=2), each of which has just one antenna element 180a and 180b (K=1), without any possibility for antenna reconfiguration. The number of cells served by each remote unit 25a, 25b is thus equal to one (N=1) as the two remote units/antenna elements serve the same cell acting as repeaters.

Equations (1) and (2) are transformed into Equation (3):

$$[D_1^j] = A_1^j \cdot [C_1^j]$$

$$U_1^j = U_1^{j-1} + B_1^j \cdot E_1^j \qquad (3)$$

In the case where the two remote units 25a and 25b of the example are two distinct cells, we would no longer have the cell-repeater configuration, but the two remote units would each use a different $C_i$ and $U_i$. It should be specified that the individual cell, identified by the coefficients $C_i$ and $U_i$, can be in the same way a microcell or a macrocell, according to the requirements of capacity and local coverage.

Figure 9:
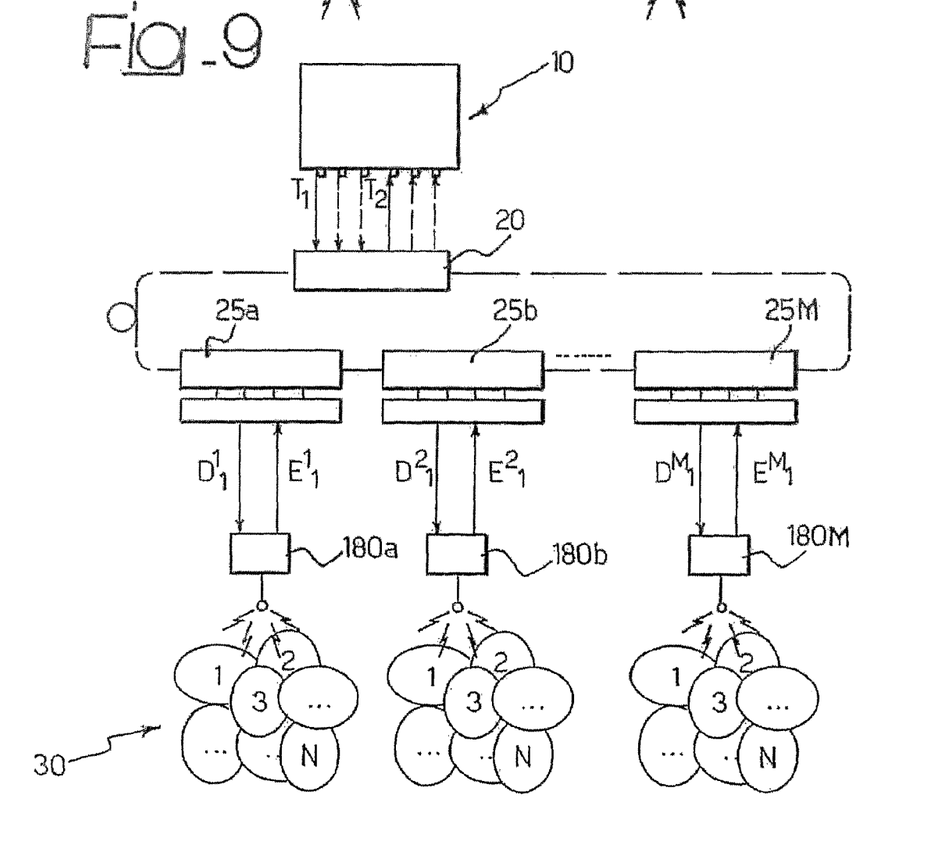
FIG. 9 shows a further example of configuration according as described herein.

A second possible implementation is schematically represented in FIG. 9. In this new case, there is set a generic number of remotized stations equal to M (25a, 25b, ... 25M), each of which could potentially be provided with 1 to N cells, designated as a whole by 30. Each remote station 25 is provided with just one radiating element 180 so that K=1.

It is hence an intermediate case between the more general one represented schematically in FIG. 1 and that of the single repeater of FIG. 8.

With this configuration, remote processing of the signal is limited to management of the cells and carriers, but the antenna element is left fixed, i.e. it cannot be reconfigured.

It is hence a multicell organization, of a macrocell or microcell type, as represented in the figure, with possible hierarchical configurations for a better planning management.

In this situation, described with reference to FIG. 9, the foregoing Equations (1) and (2) are transformed into the new Equations (4) and (5), respectively:

$$D_1^j = [A_{11}^j \quad A_{12}^j \quad \Lambda \quad A_{1N}^j ] \cdot \begin{bmatrix} C_1^j \\ C_2^j \\ \\ C_N^j \end{bmatrix} \qquad (4)$$

$$\begin{bmatrix} U_1^j \\ U_2^j \\ \\ U_N^j \end{bmatrix} = \begin{bmatrix} U_1^{j-1} \\ U_2^{j-1} \\ \\ U_N^{j-1} \end{bmatrix} + \begin{bmatrix} B_{11}^j \\ B_{21}^j \\ M \\ M \\ B_{N1}^j \end{bmatrix} \cdot E_1^j \qquad (5)$$

A "dual" solution with respect to the latter is the one whereby it is possible to have from 1 to M reconfigurable remote stations (generic K other than 1), each with just one cell (N=1). This solution is such that different remote stations equipped with reconfigurable antennas are remotized, without cell reconfiguration and without the possibility of hierarchization of the cells. In this case, Equations (1) and (2) are modified in a way that can be readily inferred.

The most general solution, and hence the most complete one, is therefore represented in FIG. 1 or FIG. 2. In this case, a reconfiguration both of a "cellular," type and of an "antenna" type becomes possible and it is possible to determine repetitions of the signal within the transport architecture, according just to the limits of the type of physical transport adopted.

Without prejudice to the principles of the invention, the details of implementation and embodiments may vary, even significantly, with respect to what is described and illustrated herein, purely by way of non-limiting example, without thereby departing from the scope of the invention, as defined in the annexed claims.

The invention claimed is:

1. A method of controlling operation of at least one radio base station in a mobile radio network, comprising the steps of:
   connecting with said radio base station a set of remote base station radio units via a digital connection carrying signals in data flows, each of said remote base station radio units being adapted to provide radio cell coverage by means of a set of communication channels and being equipped with a respective set of antenna elements, whereby said communication channels are distributed over said antenna elements according to an assignment scheme;
   arranging the signals passing through said remote base station radio units in frames, said remote base station radio units performing a numeric processing of said frames; and
   dynamically varying said assignment scheme by dynamically varying the arrangement of said signals in said frames, and
   wherein the radio base station is connected to said set of remote base station radio units via an optical digital connection and wherein said optical digital connection comprises at least one first optical fiber channel and at least one second optical fiber channel for propagating said uplink and downlink signal flows related to each remote base station radio unit in said set of remote base station radio units over said at least one first optical fiber channel and at least one second optical fiber channel, respectively.

2. The method of claim 1, wherein said step of dynamically varying said assignment scheme comprises the step of dynamically varying at least one of:
   the radio resources assigned to said remote base station radio units;
   the radiation diagram of said antenna elements; and
   the radio cell coverage provided by said remote base station radio units.

3. The method of claim 1, wherein said communication channels are transmitted over cells referring to one given carrier.

4. The method of claim 3, wherein said communication channels are transmitted over cells referring to one given carrier and one given digital frame.

5. The method of claim 1, comprising, in providing downlink transmission, the steps of:
   generating a useful signal for a given cell in radio coverage for a given carrier; and
   subjecting said useful signal to downlink processing as a function of a downlink control signal for a respective remote base station radio unit for said carrier, said downlink processing giving rise to a resulting signal to be supplied to the set antenna elements equipping said respective remote base station radio unit.

6. The method of claim 5, comprising the step of performing said downlink processing as a matrix product, wherein said downlink control signal is a matrix of downlink processing coefficients for a given antenna element of a given remote base station radio unit corresponding to a given cell for handling the downlink data flow.

7. The method of claim 6, comprising the step of performing said matrix product on a carrier by carrier basis.

8. The method of claim 6, comprising the step of performing said matrix product as the product with one matrix comprising eng lobed parameters for a plurality of carriers.

9. The method of claim 1, comprising in providing uplink transmission, the steps of:
   receiving a respective signal at a given antenna element of a given remote base station radio unit; and
   subjecting said received respective signal to uplink processing as a function of an uplink control signal for said given remote base station radio unit for a given carrier, said uplink processing giving rise to a resulting signal assigned to a given cell in the radio coverage for a given carrier for a given remote base station radio unit.

10. The method of claim 9, comprising the step of performing said uplink processing as a matrix product, wherein said uplink control signal is a matrix of uplink processing coefficients for a given antenna element of a given remote base station radio unit corresponding to a given cell for handling the uplink data flow.

11. The method of claim 9, wherein said uplink processing comprises performing, for each given cell of a plurality of cells providing radio coverage of a given remote base station radio unit, a sum of the contribution of said resulting signal flowing as an ingoing signal into said given remote base station radio unit and the contribution of said given remote radio unit itself, whereby said given remote base station radio unit is capable of:
   if said ingoing signal is zero, adding thereto its own contribution; and
   if said ingoing signal is not zero, reusing said given cell and adding its own contribution thus operating as a cell repeater.

12. The method of claim 1, comprising the steps of:
   connecting said at least one radio base station to said set of remote base station radio units via a radio over fiber optical ring configuration;
   including in said optical ring configuration at least one first optical fiber channel and at least one second optical fiber channel; and
   propagating uplink and downlink signal flows related to each remote base station radio unit in said set of remote base station radio units in opposite directions over said at least one first optical fiber channel and at least one second optical fiber channel, respectively.

13. A radio base station for a mobile radio network, comprising a set of remote base station radio units connected with said radio base station via a digital connection carring signals in data flows, each said remote base station radio unit adapted to provide radio cell coverage by means of a set of communication channels and being equipped with a respective set of antenna elements, whereby said communication channels are distributed over said antenna elements according to an assignment scheme, wherein the signals passing through said remote base station radio units are arranged in frames, and the remote base station radio units perform a numeric processing of said frames, and wherein said assignment scheme is made dynamically variable by varying the arrangement of said signals in said frames, and
   wherein the radio base station is connected to said set of remote base station radio units via an optical digital connection and wherein said optical digital connection comprises at least one first optical fiber channel and at least one second optical fiber channel for propagating said uplink and downlink signal flows related to each remote base station radio unit in said set of remote base station radio units over said at least one first optical fiber channel and at least one second optical fiber channel, respectively.

14. The station of claim 13, wherein said assignment scheme is dynamically variable to dynamically vary at least one of:
   the radio resources assigned to said remote base station radio units;
   the radiation diagram of said antenna elements; and
   the radio cell coverage provided by said remote base station radio units.

15. The station of claim 13, wherein said communication channels comprise cells belonging to one given carrier.

16. The station of claim 13, comprising a downlink transmission path configured for:
   generating a useful signal for a given cell in radio coverage for a given carrier;
   subjecting said useful signal to downlink processing as a function of a downlink control signal for a respective remote base station radio unit for said carrier, said downlink processing giving rise to a resulting signal to be supplied to the set antenna elements equipping said respective remote base station radio unit.

17. The station of claim 13, wherein said downlink transmission path is configured for performing said downlink processing as a matrix product, wherein said downlink control signal is a matrix of downlink processing coefficients for a given antenna element of a given remote base station radio unit corresponding to a given cell for handling the downlink data flow.

18. The station of claim 13, comprising an uplink transmission path configured for:
   receiving a respective signal at a given antenna element of a given remote base station radio unit; and
   subjecting said received respective signal to uplink processing as a function of an uplink control signal for said given remote base station radio unit for a given carrier, said
   uplink processing giving rise to a resulting signal assigned to a given cell in the radio coverage for a given carrier for a given remote base station radio unit.

19. The station of claim 18, wherein said uplink transmission path is configured for performing said uplink processing as a matrix product, wherein said uplink control signal is a matrix of uplink processing coefficients for a given antenna element of a given remote base station radio unit corresponding to a given cell for handling the uplink data flow.

20. The station of claim 18, wherein said uplink transmission path is configured for performing, for each given cell of a plurality of cells providing radio coverage of a given remote base station radio unit, a sum of the contribution of said resulting signal flowing as an ingoing signal into said given remote base station radio unit and the contribution of said given remote radio unit itself, whereby said given remote base station radio unit is capable of:
- if said ingoing signal is zero, adding thereto its own contribution; and
- if said ingoing signal is not zero, reusing said given cell and adding its own contribution thus operating as a cell repeater.

21. A system comprising a radio base station for a mobile radio network, the system comprising a set of remote units connected with said radio base station via a digital connection carrying signals in data flows, each said remote unit adapted to provide radio cell coverage by means of a set of communication channels and being equipped with a respective set of antenna elements, whereby said communication channels are distributed over said antenna elements according to an assignment scheme, wherein the signals passing through said remote units are arranged in frames, and the remote units perform a numeric processing of said frames, and wherein said assignment scheme is made dynamically variable by varying the arrangement of said signals in said frames, and wherein the radio base station is connected to said set of remote units via a radio over fiber optical ring configuration and wherein said optical ring configuration comprises at least one first optical fiber channel and at least one second optical fiber channel for propagating said uplink and downlink signal flows related to each remote unit in said set of remote units in opposite directions over said at least one first optical fiber channel and at least one second optical fiber channel, respectively.

22. A mobile radio network, comprising at least one radio base station the mobile radio network comprising a set of remote base station radio units connected with said radio base station via a digital connection carrying signals in data flows, each said remote base station radio unit adapted to provide radio cell coverage by means of a set of communication channels and being equipped with a respective set of antenna elements, whereby said communication channels are distributed over said antenna elements according to an assignment scheme, wherein the signals passing through said remote base station radio units are arranged in frames, and the remote base station radio units perform a numeric processing of said frames, and wherein said assignment scheme is made dynamically variable by varying the arrangement of said signals in said frames, and
- wherein the radio base station is connected to said set of remote base station radio units via an optical digital connection and wherein said optical digital connection comprises at least one first optical fiber channel and at least one second optical fiber channel for propagating said uplink and downlink signal flows related to each remote base station radio unit in said set of remote base station radio units over said at least one first optical fiber channel and at least one second optical fiber channel, respectively.

23. A non-transitory computer program product, loadable into the memory of at least one computer and comprising software code portions capable of implementing a method of controlling operation of at least one radio base station in a mobile radio network, the method comprising:
- connecting with said radio base station a set of remote base station radio units via a digital connection carrying signals in data flows, each of said remote base station radio units being adapted to provide radio cell coverage by means of a set of communication channels and being equipped with a respective set of antenna elements, whereby said communication channels are distributed over said antenna elements according to an assignment scheme;
- arranging the signals passing through said remote base station radio units in frames, said remote base station radio units performing a numeric processing of said frames; and
- dynamically varying said assignment scheme by dynamically varying the arrangement of said signals in said frames, and
- wherein the radio base station is connected to said set of remote base station radio units via an optical digital connection and wherein said optical digital connection comprises at least one first optical fiber channel and at least one second optical fiber channel for propagating said uplink and downlink signal flows related to each remote base station radio unit in said set of remote base station radio units over said at least one first optical fiber channel and at least one second optical fiber channel, respectively.

24. A method of controlling operation of at least one radio base station in a mobile radio network, the method comprising:
- connecting with said radio base station a set of remote units, each of said remote units being adapted to provide radio cell coverage by means of a set of communication channels and being equipped with a respective set of antenna elements, whereby said communication channels are distributed over said antenna elements according to a dynamically-variable assignment scheme;
- receiving a respective signal at a given antenna element of a given remote unit; and
- subjecting said received respective signal to uplink processing as a function of an uplink control signal for said given remote unit for a given carrier, said uplink processing giving rise to a resulting signal assigned to a given cell in the radio coverage for a given carrier for a given remote unit, said uplink processing comprising:
- performing, for each given cell of a plurality of cells providing radio coverage of a given remote unit, a sum of the contribution of said resulting signal flowing as an ingoing signal into said given remote unit and the contribution of said given remote radio unit itself, whereby said given remote unit is capable of:
  - if said ingoing signal is zero, adding thereto its own contribution; and
  - if said ingoing signal is not zero, reusing said given cell and adding its own contribution, thus operating as a cell repeater.

* * * * *